United States Patent
Forin et al.

(10) Patent No.: US 6,640,290 B1
(45) Date of Patent: *Oct. 28, 2003

(54) EASILY COALESCED, SUB-ALLOCATING, HIERARCHICAL, MULTI-BIT BITMAP-BASED MEMORY MANAGER

(75) Inventors: Alessandro Forin, Redmond, WA (US); Johannes Helander, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 25 days.

This patent is subject to a terminal disclaimer.

(21) Appl. No.: 09/724,704

(22) Filed: Nov. 28, 2000

Related U.S. Application Data

(63) Continuation of application No. 09/023,658, filed on Feb. 9, 1998, now Pat. No. 6,175,900.

(51) Int. Cl.[7] .............................................. G06F 12/00
(52) U.S. Cl. ....................... 711/156; 711/170; 711/172; 710/56; 707/205
(58) Field of Search ............................... 711/156, 170, 711/172, 171, 144, 145; 710/56; 707/205, 206

(56) References Cited

U.S. PATENT DOCUMENTS

| | | | | |
|---|---|---|---|---|
| 4,907,151 A | * | 3/1990 | Bartlett | 711/166 |
| 4,980,823 A | | 12/1990 | Liu | 711/136 |
| 4,992,935 A | * | 2/1991 | Comerford et al. | 711/170 |
| 5,129,085 A | * | 7/1992 | Yamasaki | 711/153 |
| 5,375,233 A | | 12/1994 | Kimber et al. | 707/205 |
| 5,390,315 A | | 2/1995 | Blandy et al. | 711/112 |
| 5,579,520 A | | 11/1996 | Bennett | 717/4 |
| 5,606,686 A | | 2/1997 | Tarui et al. | 711/121 |
| 5,613,063 A | * | 3/1997 | Eustace et al. | 714/38 |
| 5,664,160 A | | 9/1997 | Fecteau et al. | 703/23 |
| 5,701,137 A | * | 12/1997 | Kiernan et al. | 345/853 |
| 5,713,002 A | | 1/1998 | Zbikowski et al. | 711/112 |
| 5,784,699 A | | 7/1998 | McMahon et al. | 711/171 |
| 5,802,599 A | | 9/1998 | Cabrera et al. | 711/170 |
| 5,813,040 A | * | 9/1998 | Rathke | 711/156 |

(List continued on next page.)

FOREIGN PATENT DOCUMENTS

| | | | | |
|---|---|---|---|---|
| JP | 02096213 A | * | 4/1990 | G06F/3/06 |
| JP | 03092941 A | * | 4/1991 | G06F/12/00 |

OTHER PUBLICATIONS

Norton, Peter et al. "The New Peter Norton Programmer's Guide to the IBM PC & PS/2", Microsoft Press, pp. 118–121.

Wilson et al., "Dynamic Storage Allocation: A Survey and Critical Review", Department of Computer Sciences, University of Texas at Austin, 1995.

*Primary Examiner*—Hong Kim
(74) *Attorney, Agent, or Firm*—Lee & Hayes, PLLC

(57) ABSTRACT

A hierarchical bitmap-based memory manager maintains a hierarchical bitmap having an entry for each memory block in a memory heap. Each bitmap entry contains a multi-bit value that represents an allocation state of the corresponding memory block. The memory manager manages allocation, deallocation, and reallocation of the memory blocks, and tracks the changes in allocation state via the hierarchical bitmap. Using a-two-bit value, the bitmap can represent at most four different allocation states of the corresponding memory block, including a "free" state, a "sub-allocated" state in which the corresponding memory block is itself an allocated set of smaller memory blocks, a "continue" state in which the corresponding memory block is allocated and part of, but not last in, a larger allocation of plural blocks, and a "last" state in which the corresponding memory block is allocated and last in an allocation of one or more memory blocks.

63 Claims, 12 Drawing Sheets

U.S. PATENT DOCUMENTS

| | | | |
|---|---|---|---|
| 5,819,292 A | 10/1998 | Hitz et al. | 707/203 |
| 5,838,666 A | 11/1998 | Igarashi et al. | 369/275.3 |
| 5,915,129 A * | 6/1999 | Slivka et al. | 710/68 |
| 5,930,828 A * | 7/1999 | Jensen et al. | 711/170 |
| 5,956,745 A | 9/1999 | Bradford et al. | 711/137 |
| 5,991,804 A * | 11/1999 | Bolosky et al. | 709/221 |
| 6,032,160 A | 2/2000 | Lehman | 707/205 |
| 6,032,223 A * | 2/2000 | Beelitz | 711/104 |
| 6,081,800 A * | 6/2000 | Ozbutun et al. | 707/3 |
| 6,088,777 A * | 7/2000 | Sorber | 711/171 |
| 6,175,900 B1 * | 1/2001 | Forin et al. | 711/156 |
| 6,192,432 B1 * | 2/2001 | Slivka et al. | 710/57 |
| 6,223,267 B1 * | 4/2001 | Hodges et al. | 707/205 |

* cited by examiner

EASILY COALESCED, SUB-ALLOCATING, HIERARCHICAL, MULTI-BIT BITMAP-BASED MEMORY MANAGER

This is a continuation of U.S. patent application Ser. No. 09/023,658, filed Feb. 9, 1998, which is now U.S. Pat. No. 6,175,900 and issued on Jan. 16, 2001.

TECHNICAL FIELD

This invention relates to memory managers for managing physical data memory. More particularly, this invention relates to memory managers that utilize bitmaps to manage the data memory.

BACKGROUND

Most computer programs require dynamic memory allocation because the exact memory requirements needed during execution cannot typically be predicted prior to execution. Normally, a program specifies an initial amount of memory that is needed before execution starts. During execution, the program invariably requires more memory, depending on the input data it has to process or a number of other possible factors.

Ideally, the program would accurately predict how much memory it would use during execution. However, static prediction techniques are inefficient because they must conservatively estimate the worst-case maximum amount of memory that will ever be needed under all executions of the program.

As a result, software systems allow programs to specify their memory needs dynamically, and to enlarge or reduce the amount of in-use memory as needed. A "memory manager" is a software module that is in charge of handling memory allocations and deallocations for one or more application programs. Typically, the memory manager is incorporated into the computer operating system because main memory is a resource that is divided among a number of programs running on top of the operating system.

When an application program needs additional memory, it sends a request to the memory manager. In response, the memory manager allocates a memory block of a certain size for use by the program. The program can ask for the actual size of the allocated memory block, request a reallocation of the block to a larger or smaller size, and request other statistical or bookkeeping information from the memory manager. When the program finishes with the block, the memory manager deallocates the block to free that block for other uses. The primary goal of the memory manager is to efficiently perform these management tasks (i.e., allocation, reallocation, deallocation, and bookkeeping) while minimizing wasted space without undue time overhead.

There are many different types of memory managers. Perhaps the best known conventional memory manager is one that utilizes free lists. Free-list memory managers are widely used for managing addressable core memory, such as RAM (Random Access Memory). Another well-known type of memory manager is one that utilizes a bitmap to manage memory space. The bitmap memory manager is primarily used for special situations in which block size is fixed, such as managing disk memory. Bitmap memory managers have not been traditionally used to manage core memory. These two types of memory manager are discussed separately below.

Conventional Free-List Memory Manager

A free-list memory manager maintains a set of free lists that identify different size blocks of free memory space within a memory heap. In this context, the term "heap" means a pool of memory available for the allocation and deallocation of arbitrary-sized blocks of memory in arbitrary order.

FIG. 1 shows a conventional free-list memory manager 20 that manages a memory heap 22. The memory manager 20 maintains a free list 24 that identifies different sizes of free memory blocks in the memory heap 22. In this example, the free list 24 tracks blocks in various sizes that increase at a rate of a power of two, such as 16-byte, 32-byte, 64-byte, . . . , 1 page, and more than 1 page.

The free list 24 maintains entry pointers into the memory heap 22. Here, the free list 24 has an entry pointer 26 for a free 16-byte block A in the memory heap 22. The free block A maintains a pointer 28 to another free 16-byte block B within the heap 22. In this manner, one entry pointer 26 in the free list 24 eventually leads to all free 16-byte blocks in the heap 22. The free list 24 also maintains similar pointers for larger size blocks.

When asked to allocate a block of a given size, the memory manager 20 scans the free list 24 for a suitable candidate block. The memory manager 20 follows the entry pointer into heap 22 and allocates one block to the requesting program. Subsequently, when the program is finished with the block, the memory manager 20 deallocates the block and places it back on the free list 24 by adding the appropriate pointers.

One problem encountered by conventional free-list memory managers is "fragmentation". Block deallocations tend to create a disjoint array of free and in-use blocks within the heap. Over time, the fragmentation becomes more severe. As a result, there are fewer large blocks of memory available for allocation. Entries on the free list 24 tend to migrate toward smaller size blocks, as larger size blocks become extinct.

To combat excessive fragmentation, memory managers typically perform a process known as "coalescing", which attempts to combine smaller free blocks into larger free blocks for more efficient allocation. There are many techniques for coalescing, and this concept is well-understood in the art.

FIG. 2 shows one exemplary coalescing process that utilizes block headers. In FIG. 2, each block 30 in the heap has a header 32 and a data portion 34. The header 32 contains information on the size of the block and whether the block is free or in-use.

During coalescing, the memory manager examines the header of a first free block (e.g., 30(1)) and traverses forward in the heap by the size amount of the first block to the next block (e.g., 30(2)). The memory manager then looks at the header of the next block 30(2) to determine whether that block is free. If free, the memory manager combines the two blocks and forms a single header for the bigger unified block 30(1+2). The memory manager then continues to the next block in the heap, and so on. Unfortunately, this coalescing process is both time-consuming and unidirectional.

To improve speed and enable bi-directional processing, each block header might further be equipped with information indicating whether the preceding block is free. FIG. 3 shows a portion of a heap having free blocks 40. Each block 40 has a header 42 with size and use information for the local block, as well as use information for the preceding block, and a data portion 44. The use information for the preceding block is updated when the state of the preceding block is changed. In addition, each free block 40 has a trailer 46 positioned at the end of the data portion 44 to specify its block size, indicating that the free block can hold a data portion that is at the very least as large as the block size.

During coalescing, the memory manager examines the header of a free block (e.g., 40(2)) to determine whether it is free and whether the preceding block is free. If both are free, the memory manager moves backward to the trailer 46 of the preceding block (e.g., 40(1)) to learn the size of the preceding block. The memory manager combines the two free blocks and forms a new header to create a unified block 40(1+2). With the block structure of FIG. 3, the memory manager can also traverse forward in the heap according to the process described with reference to FIG. 2.

One drawback of this coalescing technique is that the block structure comes at a cost of inefficient space overhead. The headers consume memory space that could otherwise be used for data.

Another drawback concerns alignment. For 64 bit integers, for example, the data portion of the memory block structure must align on 8 byte boundaries; otherwise the processor might generate an unaligned trap. Some processors might accept the unaligned data, but with a considerable performance cost. As a result, the end of the header needs to align at 64 bits. As the amount of header information grows (i.e., by adding information on preceding or succeeding blocks), the header itself must grow at 8 byte increments. As a result, there may be more space reserved for the header than is actually needed, just for alignment purposes. This leads to further inefficient utilization of memory resources.

The technology trend is for processors to increase in speed much more rapidly than the memory system. To an application program, future memory systems will appear increasingly slow. The only component of the memory hierarchy that is expected to keep pace with the processor speed is the cache subsystem, primarily because it is implemented inside the processor itself The free list management technique does not perform well with respect to this technological trend. A memory block typically spans multiple cache lines. The traversal of a free list involves fetching at least one new cache line per candidate block. As a result, the free list approach tends to result in an inefficient use of the cache. Additionally, when reading a block, the cache must waste space to hold the header and trailer, which is useless outside the context of coalescing.

Conventional Bitmap Memory Manager

FIG. 4 shows a conventional bitmap memory manager 50 that is typically employed to manage disk memory, as represented by memory 52. Each block in the memory 52 is of equal size. The memory manager maintains a bitmap 54 to identify free and used blocks in the memory 54. There is a one-to-one correspondence between a bit in the bitmap 52 and a block in the memory 54. The bit is set to one binary value when the corresponding block is free and to another binary value when the corresponding block is in use. It is noted that the bitmap 54, although shown within memory manager 50, may be stored on one of the blocks in the memory 52.

When a request for memory is received, the memory manager 50 scans the bitmap 54 to locate one or more free blocks. The memory manager 50 then allocates those block(s) and changes the corresponding bit to indicate that the block(s) are now in use.

One of the drawbacks of the conventional bitmap memory manager 50 is that it cannot accommodate arbitrary size blocks. Inherent in the conventional bitmap-centric architecture is a requirement that the memory blocks all be the same size. Conventional disk memories, for example, are configured with fixed size blocks. Accordingly, the memory manager is left only with the responsibility of allocating and deallocating blocks. There is no block reallocation task, because the fixed-size blocks never need enlarging or shrinking. As a result, the bitmap memory manager 50 has not traditionally been employed for managing addressable core memory, but rather has been used exclusively for disk memory.

For additional background on conventional memory managers, the reader is directed to an article entitled "Dynamic Storage Allocation: A Survey and Critical Review" by Paul R. Wilson, Mark S. Johnstone, Michael Neely, and David Boles. This article was published as Springer Verlag Lecture Notes in Computer Science in Proceedings of the 1995 International Workshop on Memory Management, Kinross, Scotland, UK, September 1995. This article is incorporated by reference.

Accordingly, there remains a need for a core memory manager that addresses the problems of the free list memory manager (i.e., space overhead for header, time cost for coalescing process, inefficient utilization of cache, memory alignment). Furthermore, unlike allocating conventional disk memory, it is desirable that the memory manager be capable of allocating arbitrary size blocks without restriction.

SUMMARY

This invention relates to a memory manager that utilizes a hierarchical bitmap to manage memory. The memory manager is primarily intended for core memory, although it may be used to manage other memory types, such as disk memory.

The memory manager maintains a hierarchical bitmap having an entry for each memory block in a memory heap. Each bitmap entry contains a multi-bit value that represents an allocation state of the corresponding memory block. The memory manager manages the memory blocks and tracks changes in allocation state via the hierarchical bitmap.

In the described implementation, each bitmap entry has a two-bit value to represent at most four different allocation states of the corresponding memory block. These four allocation states include a "free" state in which the corresponding memory block is not allocated; a "sub-allocated" state in which the corresponding memory block is itself an allocated set of smaller memory blocks; a "continue" state in which the corresponding memory block is allocated and part of, but not last in, a larger allocation of plural blocks; and a "last" state in which the corresponding memory block is allocated and last in an allocation of one or more memory blocks.

When the memory manager receives a request to allocate one or more free memory blocks in the memory heap, the memory manager recursively scans the hierarchical bitmap for one or more bitmap entries having a multi-bit value that indicates the corresponding memory block is free for allocation. The memory manager then allocates these free blocks and updates the multi-bit values in the corresponding bitmap entries to indicate that they are no longer free. To deallocate a memory block, the memory manager changes the corresponding bitmap entry in the hierarchical bitmap to a multi-bit value indicating that the memory block is now free.

Due to the multi-bit entries, the bitmap can track several different allocation states. As a result, this allocation information is no longer kept in headers and/or trailers and the blocks are able to store more data. One advantage that arises from this elimination of block overhead is that all adjoining free memory blocks automatically coalesce simply by being marked as free, without special coalescing processes that check headers and combine adjoining blocks. During subsequent allocation, adjoining free blocks are available for joint allocation, and this availability can be determined solely from the corresponding bitmap entries.

The memory manager can also efficiently reallocate memory to enlarge or reduce the amount of allocated memory. To enlarge a particular allocation of memory blocks, the memory manager scans the hierarchical bitmap to locate a bitmap entry corresponding to a next memory block following the memory blocks in the previous allocation. The memory manager then looks at whether the bitmap entry has a multi-bit value indicating that the next memory block is free. If so, the present allocation can be enlarged to include the free next memory block.

To reduce a particular allocation, the memory manager scans the hierarchical bitmap to locate a bitmap entry corresponding to a memory block that is last in the memory blocks of the allocation. The memory manager then changes a multi-bit value in the located bitmap entry to indicate that the last memory block is free.

Among the benefits of the hierarchical bitmap memory manager are the elimination of costly header overhead from memory blocks, and the elimination of coalescing time by enabling a system that inherently coalesces neighboring free blocks. Another benefit is that the memory manager is not restricted to maintain a constant block size, but can suballocate many different and arbitrary sizes of blocks.

BRIEF DESCRIPTION OF THE DRAWINGS

FIG. 2 illustrates a coalescing process to form a single block that is performed by the conventional free-list memory manager.

FIG. 3 illustrates another coalescing process to form a single block that is performed by the conventional free-list memory manager.

FIGS. 8a and 8b illustrate a process of automatically coalescing free memory blocks, with FIG. 8a showing the memory heap and bitmap before coalescing and FIG. 8b showing the memory heap and bitmap after coalescing.

FIGS. 10a and 10b illustrate a process of reducing the size of a memory allocation, with FIG. 10a showing the memory heap and bitmap before reduction and FIG. 10b showing the memory heap and bitmap after reduction.

FIGS. 11a and 11b illustrate a process of enlarging the size of a memory allocation, with FIG. 11a showing the memory heap and bitmap before enlargement and FIG. 11b showing the memory heap and bitmap after enlargement.

DETAILED DESCRIPTION

This invention concerns a memory manager for managing physical data memory. The memory manager is primarily intended for managing addressable core memory, and is described in this context. Within this context, the memory manager is described as being incorporated into an operating system of a conventional general purpose computer. However, the memory manager is also suitable for managing other forms of memory, such as disk memory, and hence may be implemented in places other than the operating system or a general purpose computer.

Figure 1:
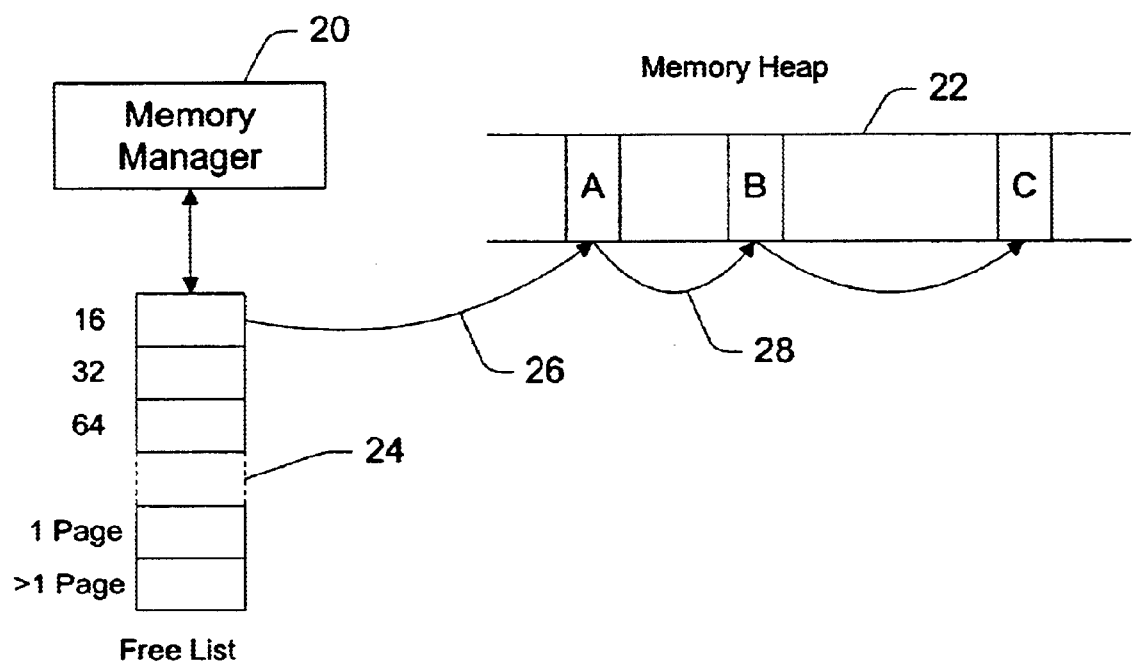
FIG. 1 is a diagrammatic illustration of a conventional free-list memory manager.
Figure 2:
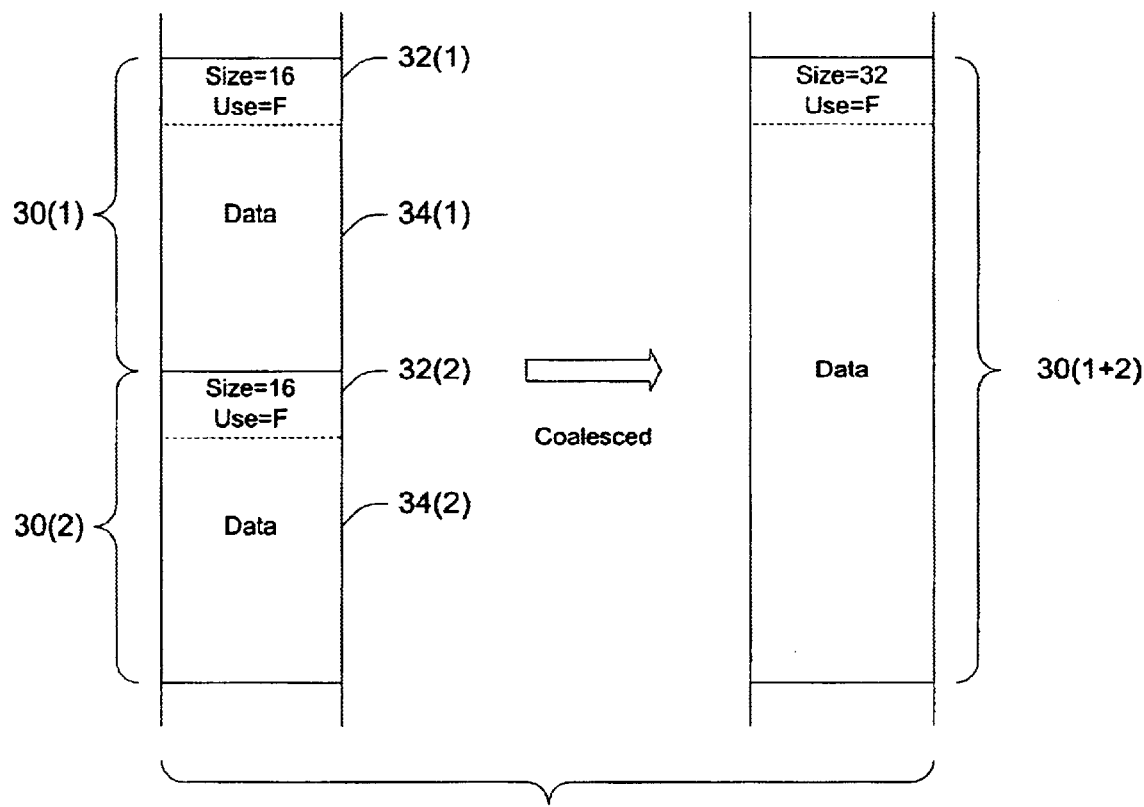
FIG. 2 shows two blocks in a memory heap, with each block having a header.
Figure 3:
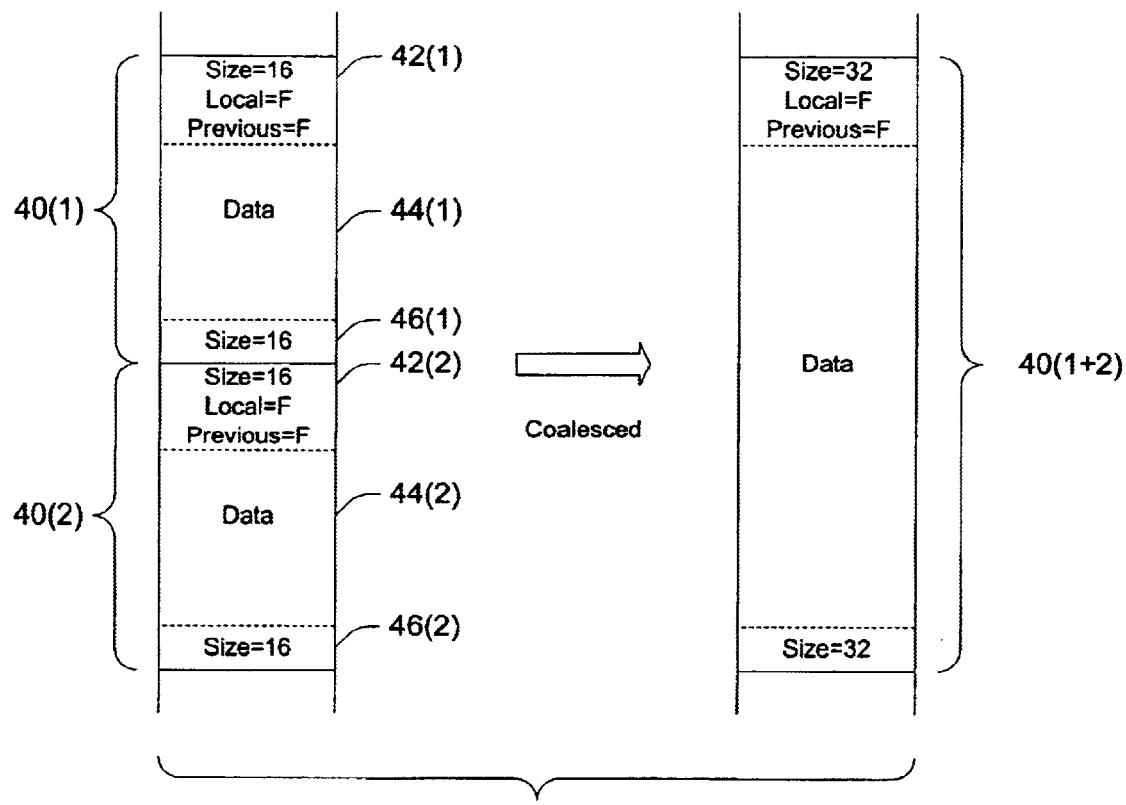
FIG. 3 shows two blocks in a memory heap, with each block having a header and a trailer.
Figure 4:
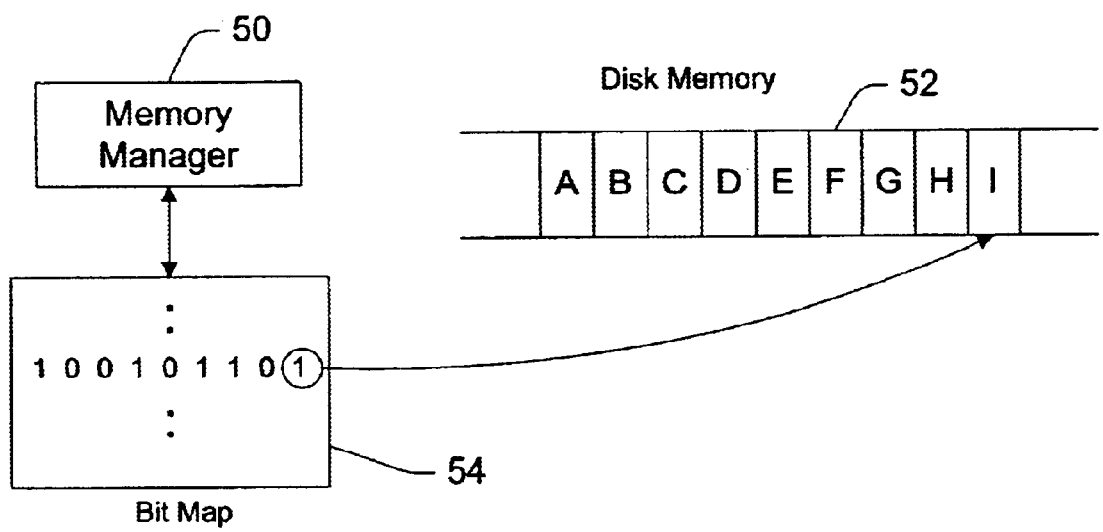
FIG. 4 is a diagrammatic illustration of a conventional bitmap memory manager.
Figure 5:
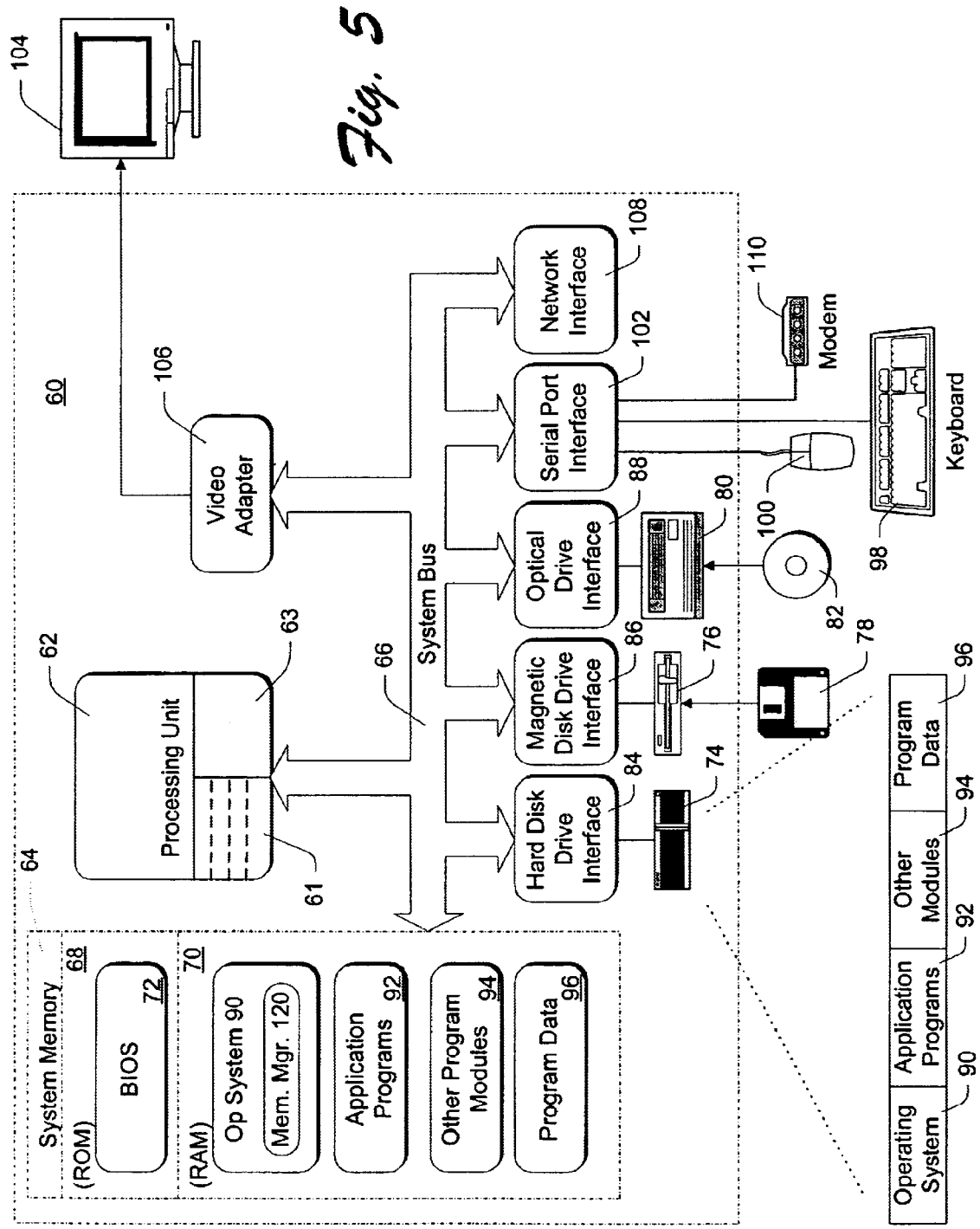
FIG. 5 is a block diagram of a computer system that implements a hierarchical bitmap memory manager.

FIG. 5 shows an example implementation of a general purpose computing device in the form of a conventional personal computer 60. The computer 60 includes a processing unit 62, a system memory 64, and a system bus 66 that couples various system components including the system memory 64 to the processing unit 62. The system bus 66 may be any of several types of bus structures including a memory bus or memory controller, a peripheral bus, and a local bus using any of a variety of bus architectures.

Processor 62 typically includes cache circuitry 61, which includes cache memories having cache lines, and pre-fetch circuitry 63. The processor 62, the cache circuitry 61 and the pre-fetch circuitry 63 operate with each other in a traditional manner. The system memory 64 includes read only memory (ROM) 68 and random access memory (RAM) 70. A basic input/output system 72 (BIOS) is stored in ROM 68.

The computer 60 also has one or more of the following drives: a hard disk drive 74 for reading from and writing to a hard disk, a magnetic disk drive 76 for reading from or writing to a removable magnetic disk 78, and an optical disk drive 80 for reading from or writing to a removable optical disk 82 such as a CD ROM or other optical media. The hard disk drive 74, magnetic disk drive 76, and optical disk drive 80 are connected to the system bus 66 by a hard disk drive interface 84, a magnetic disk drive interface 86, and an optical drive interface 88, respectively. The drives and their associated computer-readable media provide nonvolatile storage of computer readable instructions, data structures, program modules and other data for the personal computer 60.

Although a hard disk, a removable magnetic disk 78, and a removable optical disk 82 are described, it should be appreciated by those skilled in the art that other types of computer readable media can be used to store data. Other such media include magnetic cassettes, flash memory cards, digital video disks, Bernoulli cartridges, random access memories (RAMs), read only memories (ROM), and the like.

A number of program modules may be stored on the hard disk, magnetic disk 78, optical disk 82, ROM 68, or RAM 70. These programs include an operating system 90, one or more application programs 92, other program modules 94, and program data 96. A user may enter commands and information into the personal computer 60 through input devices such as a keyboard 98 and a mouse 100. Other input devices (not shown) may include a microphone, joystick, game pad, satellite dish, scanner, or the like. These and other input devices are often connected to the processing unit 62 through a serial port interface 102 that is coupled to the system bus 66, but may be connected by other interfaces, such as a parallel port, game port, or a universal serial bus (USB). A monitor 104 or other type of display device is also connected to the system bus 66 via an interface, such as a video adapter 106. In addition to the monitor, personal computers typically include other peripheral output devices (not shown) such as speakers and printers.

The server computer 60 has a network interface or adapter 108, a modem 110, or other means for establishing communications over a network (e.g., LAN, Internet, etc.). The modem 110, which may be internal or external, is connected to the system bus 66 via the serial port interface 102.

Hierarchical Bitmap Memory Manager

A memory manager 120 resides in the operating system 90. The memory manager 120 handles allocations, reallocations, and deallocations of RAM 70 for one or more application programs 92, other program modules 94, or internal kernel operations. The memory manager is tasked with dividing memory resources among these executables.

The memory manager 120 maintains a hierarchical bitmap that tracks memory usage. The hierarchical bitmap has a multi-bit entry for each corresponding memory block. In one implementation, the bitmap employs a two-bit entry for each corresponding block. The two-bit entry defines one of four possible allocation states of the memory block: free, continue, last, and sub-allocated.

A "free" block is one that is not currently allocated and is available for use.

A "continue" block is an allocated block that is currently in use. It is only one block in a series of allocated blocks. The continue block can be any block in the series including the starting block, except it cannot be the ending block.

A "last" block is an allocated block that is the ending block in a series of blocks that are part of a large allocation. The designation "last" is also used to identify a single allocated block, since the single block is also the ending block.

A "sub-allocated" block is a block that is itself a heap. That is, the sub-allocated block consists of a number of smaller-size blocks.

Table 1 shows one possible value key that maps two-bit values to the corresponding allocation states.

TABLE 1

| Bit Value | Allocation State |
|---|---|
| 00 | Sub-allocated |
| 01 | Free |
| 10 | Last |
| 11 | Continue |

Figure 6:
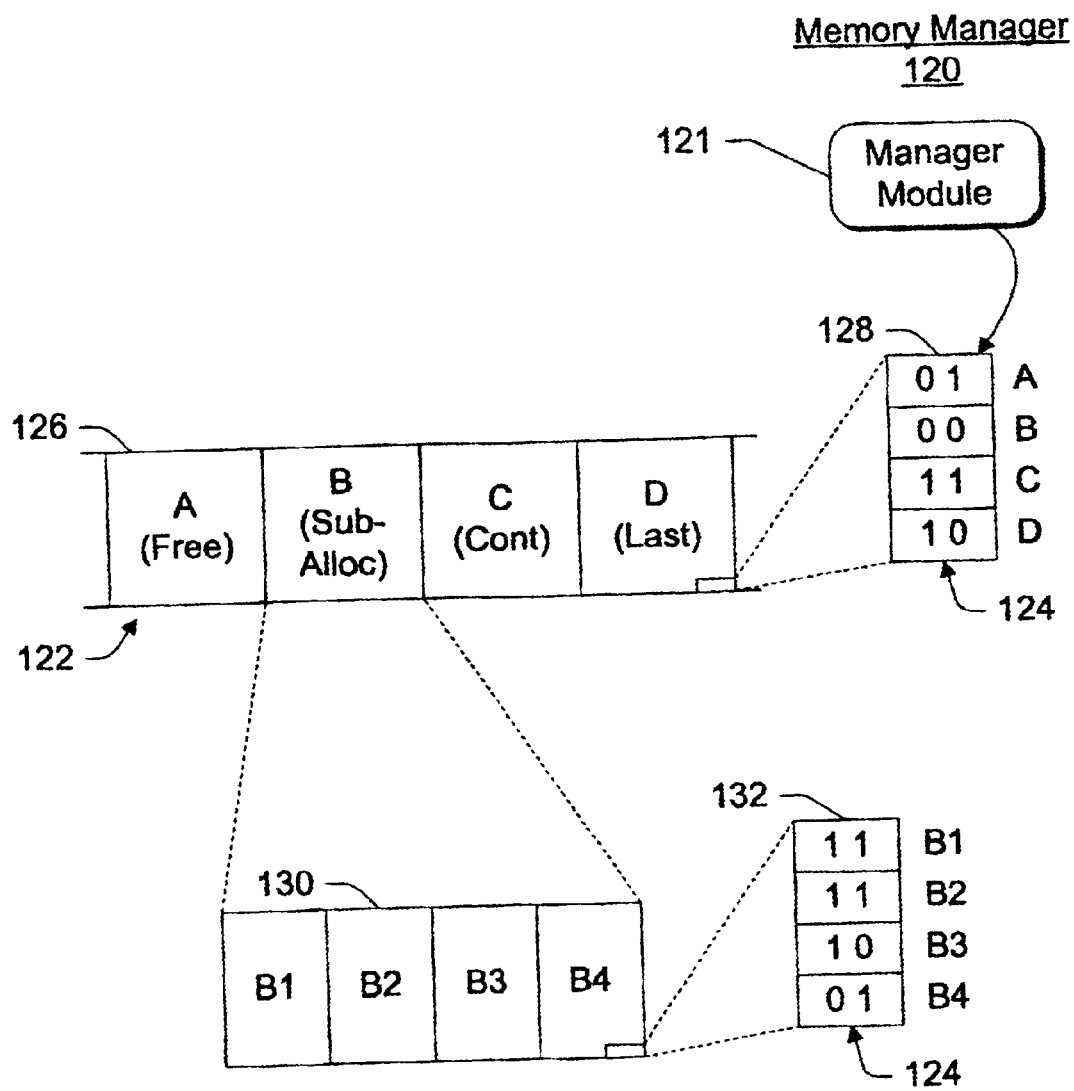
FIG. 6 is a diagrammatic illustration of the hierarchical bitmap memory manager.

FIG. 6 shows the memory manager 120 for managing a memory heap 122. For purposes of continuing discussion, the memory manager is described as managing a "memory heap", without limitation to a particular type or location of physical memory that makes up the heap. The memory manager 120 includes a manager module 121 that facilitates various management functions (allocation, deallocation, reallocation, etc.). The manager module is implemented, for example, as software code incorporated into the operating system 90.

The memory manager 120 modifies or manipulates a hierarchical bitmap 124, which tracks individual blocks in the memory heap 122. The hierarchical bitmap 124 has a two-bit entry for each corresponding block in memory heap 122. In this implementation, the bitmap 124 is broken into partial bitmaps and distributed throughout the memory heap to define neighboring blocks. Here, the heap 122 groups four contiguous blocks into one set, with every four-block set being tracked by an associated four-entry partial bitmap.

In this example, memory heap 122 has an array of memory blocks, as represented by a four-block set 126 having blocks A, B, C, and D. A set 126 has a corresponding four-entry hierarchical bitmap 128 that is stored, for example, as the last byte in the final block D. Each two-bit entry in the bitmap 128 corresponds to one of the blocks A, B, C, and D. Block A is free, as indicated by the value "01" in the bitmap 128. Block B is sub-allocated, as indicated by the value "00" in the bitmap 128. Block C is a continue block, as indicated by the value "11" in the bitmap 128, and block D is a last block, as indicated by the value "10" in the bitmap 128.

The sub-allocated block B is itself a set 130 of four sub-blocks B1, B2, B3, and B4. The set 130 has its own corresponding four-entry hierarchical bitmap 132 that is stored as the last byte in the final block B4. Each two-bit entry in the bitmap 132 corresponds to one of the blocks B1, B2, B3, and B4. Here, blocks B1 and B2 are continue blocks, block B3 is a final block, and block B4 is free. It is noted that one or more of the sub-blocks may also be sub-allocated into an even smaller set of four smaller-size blocks.

One advantage of the hierarchical bitmap-based memory manager 120 is that it can allocate memory blocks of arbitrary sizes. As shown in FIG. 6, the memory manager 120 can allocate a first block of one size, say block A in set 126, and a second block of another size, say block B4 in set 130. The ability to sub-allocate blocks, and to track the sub-allocations, enables the memory manager to allocate arbitrary sizes.

The number and size of blocks to include in each set of the memory heap involves various design tradeoffs. With larger size and/or fewer blocks, the hierarchical bitmap can be kept smaller. Conversely, smaller size and/or more blocks within each set lead to a larger bitmap.

The above implementation employs four distinct allocation states: free, continue, last, and sub-allocated. In other implementations, the memory manager might employ three distinct allocation states. For instance, in one case, the memory manager might designate the memory blocks as "free", "in use", or "sub-allocated". In this case, the "in use" designation means an allocated block, regardless of whether it is located at the beginning, middle, or end of a series of blocks.

In another case, the memory manager might designate the memory blocks as "free", "continue", or "last". In this case, there are two different types of allocated blocks "continue" and "last". This case does not, however, track sub-allocations and hence all blocks are of a constant minimum size. Larger allocations are still possible, but only as multiples of the minimum size.

It is noted that the bitmap may be kept in the memory manager separate from the heap. A separate architecture might be advantageous in the context of managing virtual memory.

Allocation

Figure 7:
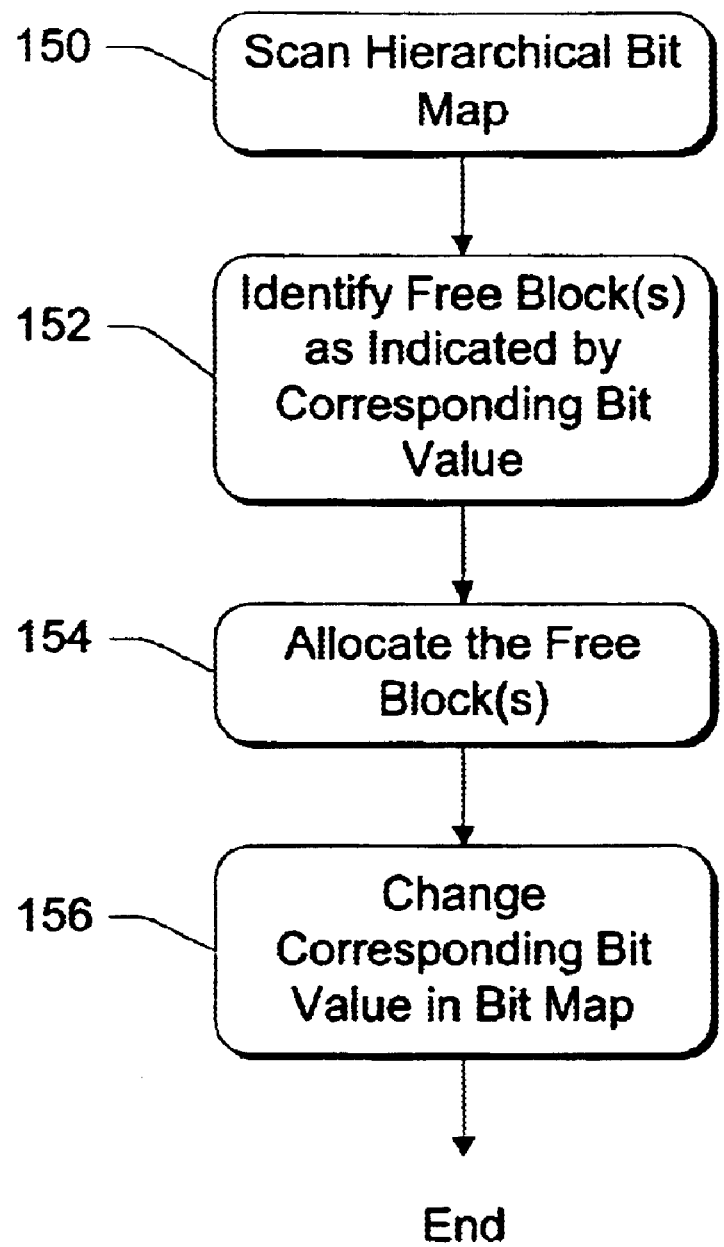
FIG. 7 is a flow diagram showing steps in a method for searching for free memory blocks using a hierarchical bitmap.

FIG. 7 shows steps in a method for locating free blocks using the hierarchical bitmap data structure 124. The steps are implemented in software within the memory manager 120. When asked to allocate a block of a given size, the memory manager 120 scans the bitmap 124 to locate a free block of appropriate size (step 150). Suppose, for example, the program wanted a block of the size comparable to one of the blocks A, B, C, and D. The memory manager 120 scans the partial bitmap 128 to locate the free block A, which is indicated as free by the corresponding bit value "01" in bitmap 128 (step 152 in FIG. 7).

The memory manager allocates the free block A (step 154). The memory manager then updates the corresponding bit value in the bitmap 128 (step 156 in FIG. 7). In this case, the block A is now its own series of one allocated block, which is designated as a "last" block. Accordingly, the memory manager changes the bit entry from free (i.e., "01") to last (i.e., "10").

An advantage of this memory management system is that free block searching can be conducted entirely within the hierarchical bitmap. Unlike prior art free list systems, there is no need to access the memory heap and follow pointers through the heap to determine what blocks are free.

Coalescing

Figure 8A:
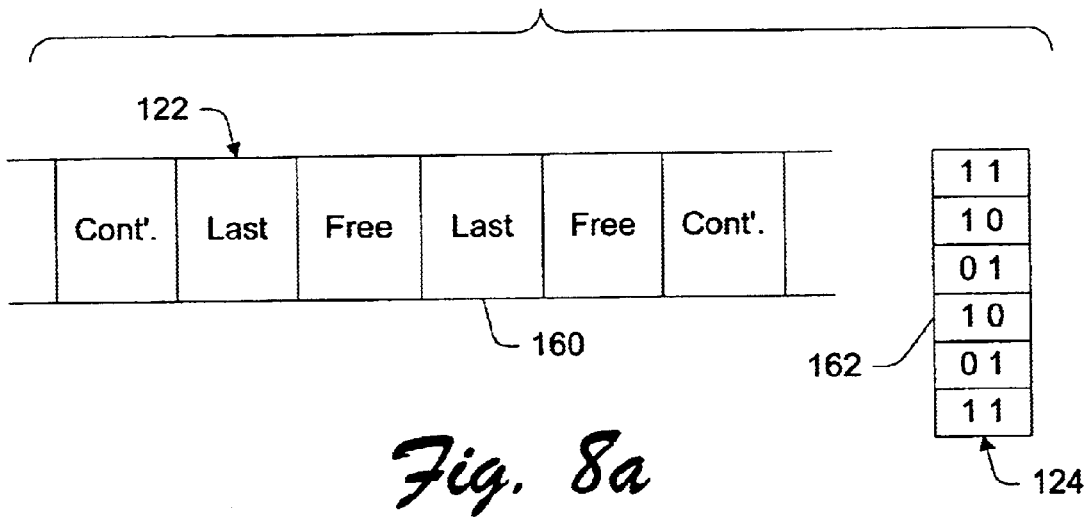
FIGS. 8a and 8b show a series of blocks in a memory heap and a corresponding portion of the hierarchical bitmap.
Figure 8B:
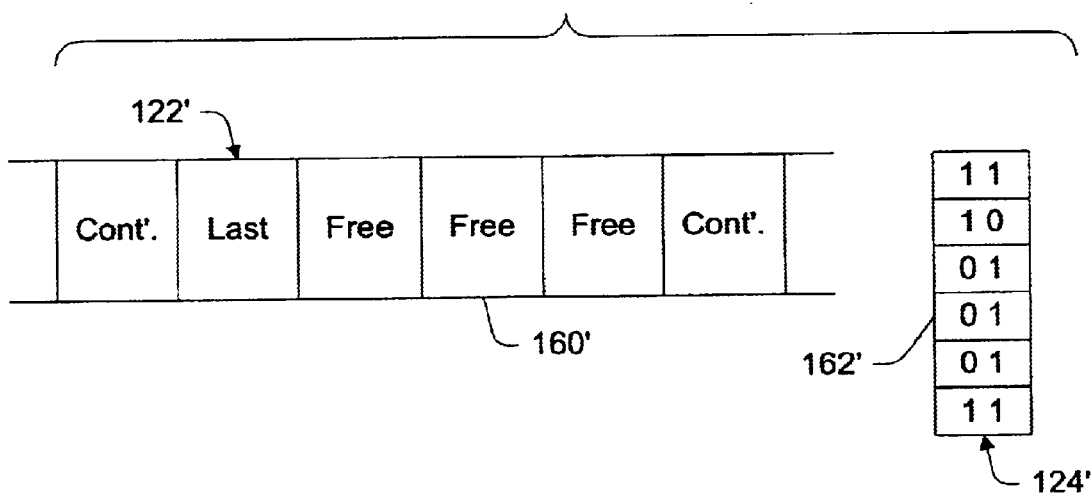

One significant advantage of the hierarchical bitmap-based memory manager 120 is that the coalescing process is automatic without any processing cost. FIGS. 8a and 8b show an example of inherent coalescing that is made possible by the memory manager's architecture. FIG. 8a shows the memory heap 122 and hierarchical bitmap 124 prior to coalescing and FIG. 8b shows the memory heap and hierarchical bitmap after coalescing.

Suppose the memory heap 122 has an array of allocated and unallocated blocks. The allocation states are written in the blocks to assist in describing the example. Included in the blocks is a block 160, which is currently allocated. The corresponding bitmap entry 162 in hierarchical bitmap 124 is set to a value "10", which means that block 160 is the "last" (and in this case, only) allocated block in its series.

When the memory block 160 is freed, the memory manager 120 changes the corresponding bit value in entry 162 to a value of "01", which designates the block 160 as free. FIG. 8b shows the memory heap 122' following deallocation of block 160, and the bitmap 124' with modified entry 162'.

It is noted that a memory block can be freed by giving the memory manager any arbitrary pointer into the middle of the block 160. This is unlike prior art memory management systems, which require a pointer to the start of the block in order to change the header and deallocate the block.

With the hierarchical bitmap, the memory blocks themselves do not use headers or trailers to maintain pointers, size information, allocation information, and so forth. When two or more neighboring blocks are marked as free, they are automatically and immediately available for allocation as a single piece of memory. That is, adjoining free blocks of memory inherently coalesce without traditional coalescing processes.

In this example, prior to deallocation of block 160 (FIG. 8a), the memory heap 122 contains a sequence of "free", "last", and "free" blocks, wherein the largest allocatable block in this sequence is one block size. Following deallocation of block 160' and the update of bitmap entry 162' (FIG. 8b), the memory heap 122' now has a run of three adjoining free blocks, which may be allocated as a larger three-block memory area. The process of marking the block 160' as free in the memory heap 122' automatically coalesced three blocks to form a larger-size, allocatable area.

Reallocating

Unlike prior art bitmap memory managers, the hierarchical bitmap memory manager enables reallocation of blocks, which involves enlarging or reducing the size of a currently allocated block.

Figure 9:
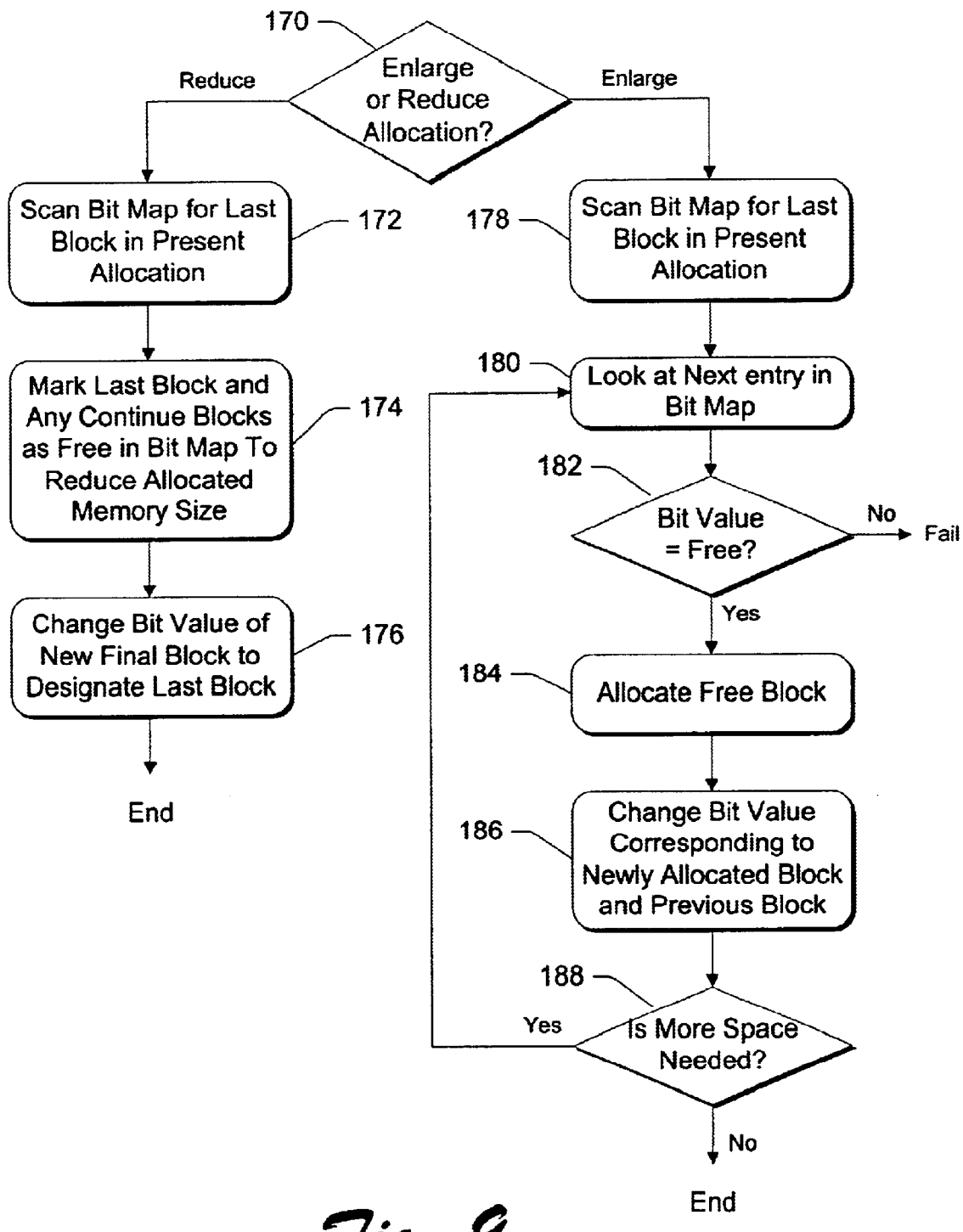
FIG. 9 is a flow diagram showing steps in a method for reallocating memory blocks using the hierarchical bitmap.

FIG. 9 shows steps in a method for reallocating blocks using the hierarchical bitmap data structure 124. These steps are implemented in software within the memory manager 120. At step 170, the memory manager receives a request for reallocation and determines whether the request is to enlarge or reduce the present block allocation. Assuming the request is to reduce the size (i.e., the "reduce" branch from step 170), the memory manager scans the bitmap 124 for the last memory block that is presently allocated to the requester (step 172). The memory manager 120 might already know the present set of blocks allocated to the requestor, or alternatively, the reallocation request might contain a pointer to one block within the present allocation.

Figure 10A:
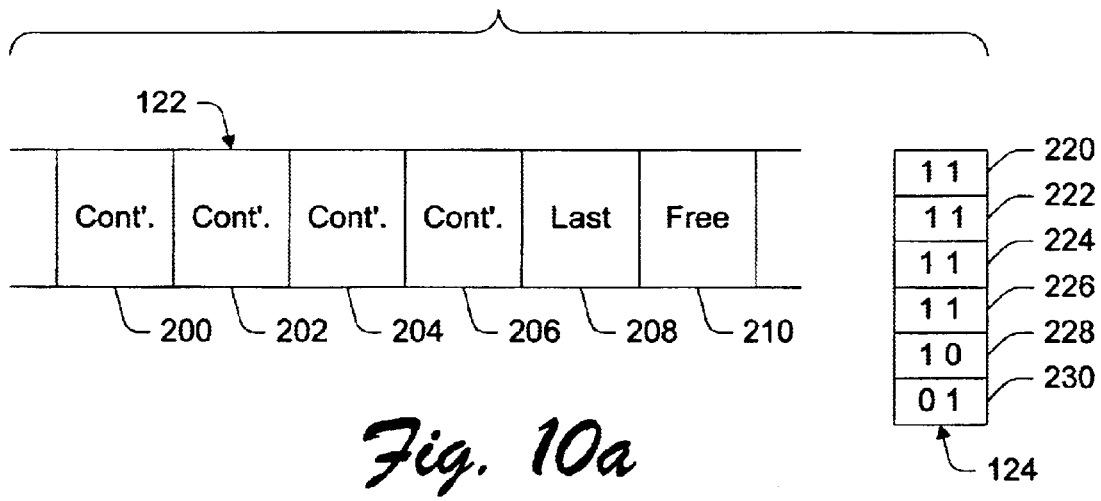
FIGS. 10a and 10b show a series of blocks in a memory heap and a corresponding portion of the hierarchical bitmap.
Figure 10B:
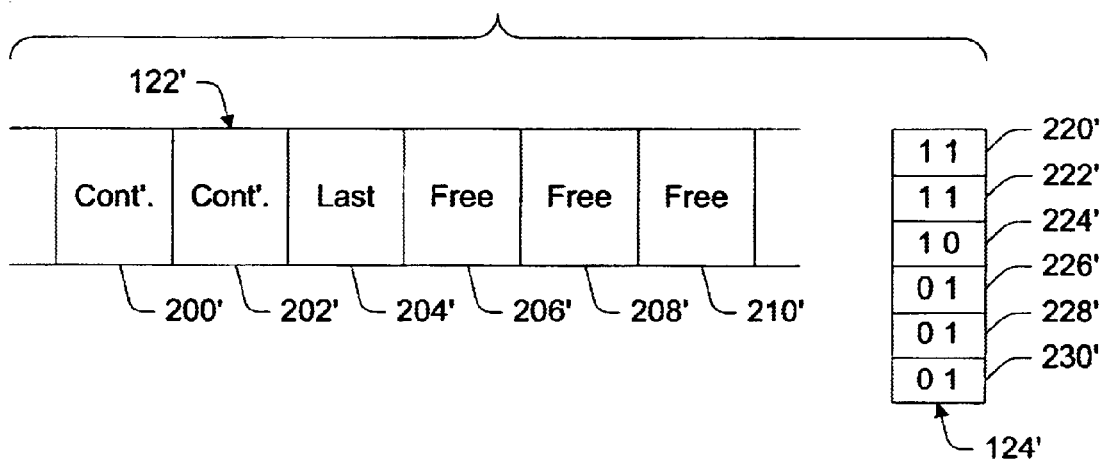

FIGS. 10a and 10b illustrate the reduction process, with FIG. 10a showing the memory heap and bitmap prior to a reducing reallocation and FIG. 10b showing the memory heap and bitmap after the reducing reallocation. In FIG. 10a, a portion of the memory heap 122 contains part of the allocated block series that includes four "continue" blocks 200–206, followed by a "last" block 208 and a "free" block 210. The associated portion of the bitmap 124 is illustrated beside the heap portion 122. Bitmap entries 220–230 correspond respectively to the six blocks 200–210. At step 172, the memory manager scans the bitmap 124 to locate a last value "10" at entry 228, which corresponds to the last block 208.

At step 174 in FIG. 9, the memory manager works backward from the last block, deallocating the blocks no longer needed in the present allocation. The memory manager marks all entries in the bitmap 124 that correspond to the deallocated blocks with a multi-bit value "01". When the reallocation results in a sufficient size reduction, the memory manager changes the bit value in the bitmap 124 that corresponds to the new final block to a "last" or "10" value (step 176 in FIG. 9).

With reference to FIG. 10a, suppose the reallocation request asked to shrink the present allocation by two memory blocks. Working backwards from last block 208, the memory manager frees "last" block 208 and the next-to-last "continue" block 206. This is done by simply changing the multi-bit value in corresponding entries 228 and 226 to a free value "01", as shown by entries 228' and 226' in FIG. 10b. Then, the memory manager changes the bit entry 224 for the new last block 204 from a continue value "11" to a last value "10", as represented by the entry 224' in FIG. 10b.

With reference again to FIG. 9, suppose the request is to enlarge the size of the present allocation (i.e., the "enlarge" branch from step 170). At step 178, the memory manager scans the bitmap 124 for the last block of the memory heap that is presently allocated to the requestor.

Figure 11A:
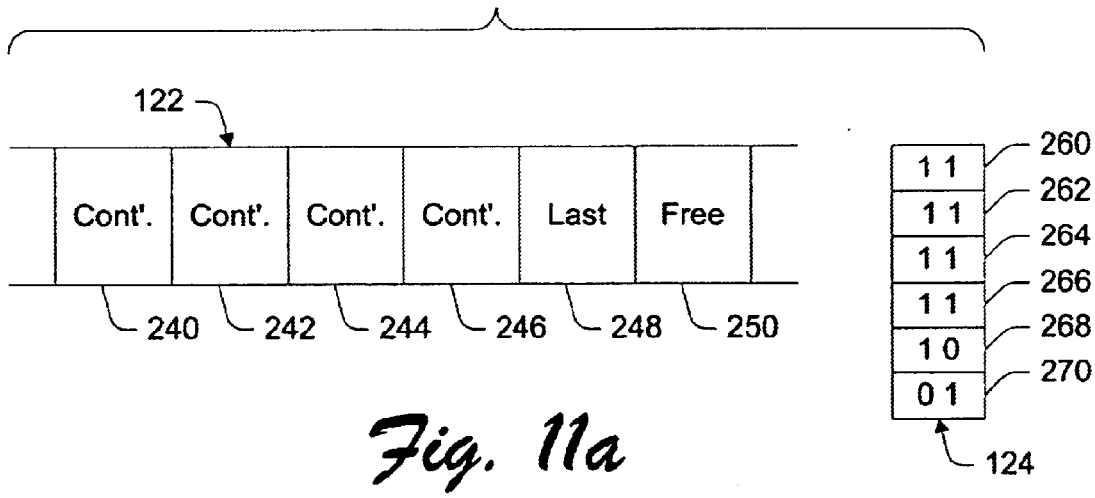
FIGS. 11a and 11b show a series of blocks in a memory heap and a corresponding portion of the hierarchical bitmap.
Figure 11B:
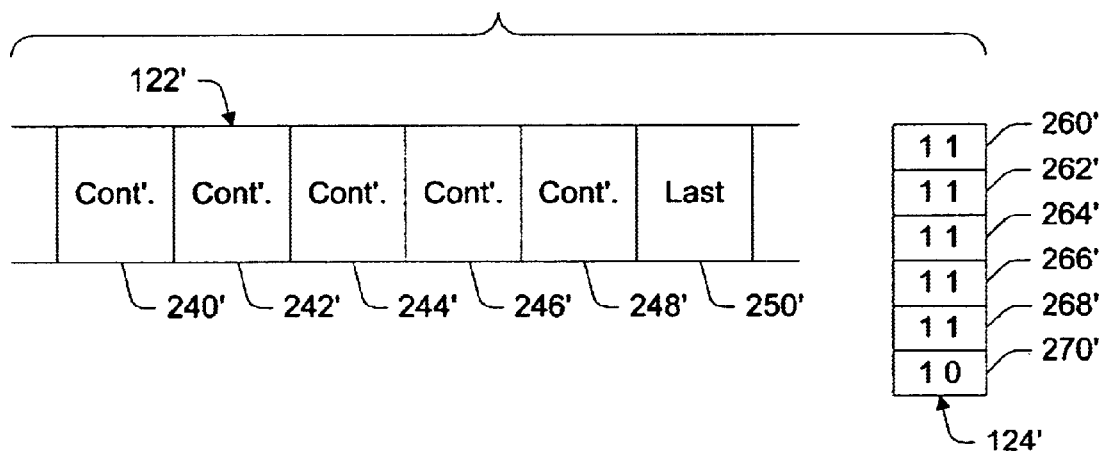

FIGS. 11a and 11b illustrate the enlargement process, with FIG. 11a showing the memory heap and bitmap prior an enlarging reallocation and FIG. 11b showing the memory heap and bitmap after the enlarging reallocation. In FIG. 11a, a portion of the memory heap 122 contains part of the allocated block series that includes four "continue" blocks 240–246, followed by a "last" block 248 and a "free" block 250. The associated portion of the bitmap 124 is illustrated beside the heap portion 122. Entries 260–270 correspond respectively to the six blocks 240–250. To begin the enlargement process, the memory manager scans the bitmap 124 to locate a last value "10" at entry 268, which corresponds to the last block 248 (step 178 in FIG. 9).

At step 180 in FIG. 9, the memory manager examines the next multi-bit entry 270 in the bitmap 124, which corresponds to the next block 250 in the heap 122. If the multi-bit value is not "free" or "01" (meaning that the corresponding block is a single allocated block and hence has a corresponding "last" or "10" multi-bit value, or is sub-allocated and hence has a corresponding "sub-allocated" or "00" multi-bit value), the reallocation process fails. The memory manager informs the requestor that enlargement is not possible at this time.

On the other hand, if the bit value in the next entry 270 is "01", the memory manager allocates the corresponding free block 250 (step 184 in FIG. 9). Next, at step 186, The memory manager changes the multi-bit values of the previous ending block 248 from a last value "10" to a continue value "11" and the newly allocated block 250 from a free value "01" to last value "10".

The memory manager determines whether more space is needed to fulfill the reallocation request (step 188 in FIG. 9). If so, the memory manager looks at the next block in the heap (step 180). The process continues block by block until either the reallocation request fails, or is fulfilled.

Alternatively, the memory manager might make one initial pass to find enough consecutive free space, and a second separate pass to mark the blocks as in use.

FIG. 11b shows the results of a reallocation request to enlarge the present allocation by one block. The free block 250 is marked as a "last" block within bitmap 124', as indicated by bit value "10" in entry 270'. The previous ending block 248 is changed to a "continue" block from a "last" block in bitmap 124', as indicated by the bit value "11" in entry 268'.

As this example illustrates, another advantage of the hierarchical bitmap-based memory manager is that the size of an allocated block can be changed (enlarged or reduced) by modifying only the hierarchical bitmap. There is no requirement to perform data copies or even to access the memory block itself.

Reservation

In some cases, the application program 92 or the operating system 90 or other program modules 94 may request a specific portion of memory, starting at a specified address. The process of dedicating this specific memory portion to the processor is known as "reservation." When the memory manager 120 desires to reserve a block, it scans the hierarchical bitmap 124 for the bit entry corresponding to the block. If the bit entry shows the block as free, the memory manager 120 changes the bit entry to an allocated value, such as a last value "10" or a continue value "11", to reserve that memory for the processor. The hierarchical bitmap scheme is extremely efficient at reserving blocks for specific use, especially in comparison to most prior art techniques (and particularly, the free-list approach).

Cache

The hierarchical bitmap memory manager is very cache-friendly.

To perform the various processes described above, the memory manager does not access the memory blocks themselves, but only the hierarchical bitmap. The data itself is in fact of no use to the memory manager, and only would result in cache pollution. Conversely, any header information is of no use to the application, and again would result in cache pollution. The hierarchical bitmap memory manager avoids both types of cache pollution.

Big portions of the bitmap, and sometimes the entire bitmap can be loaded into cache for rapid processing, such as searching and reallocation. Since the memory manager only examines two bits per block (in this implementation), the cache holds information about many more memory blocks in the same number of bits, as compared to the free-list memory managers.

In the case of a sequential search the entire cache line is now useful because the bits are contiguous in the bitmap. For comparison, the free-list approach would most likely use one cache line per header while searching. For example, if the processor cache line size were 32 bytes, one cache line worth of the bitmap would describe 128 blocks.

The same considerations apply to the data portion of a block. If the application is using many small blocks, and especially when accessing them in sequence, there is now a higher probability that the blocks will all be located in the same cache line. In general, the cache contains a higher average number of blocks per cache line.

Another advantage is that the memory accesses to the hierarchical bitmap itself are fully predictable. This enables optimization of cache execution speed by pre-fetching cache lines ahead of the time they are needed. For comparison, the free-list based approach is totally unpredictable; the next header to be examined depends on the dynamics of allocations, deallocations, and coalescing.

One additional advantage is that the hierarchical bitmap memory manager produces naturally aligned allocations. Because the memory manager employs a hierarchical bitmap, the memory blocks themselves are not equipped with headers and trailers, as is common in conventional free list memory managers. As a result, the memory blocks are inherently aligned for cache operations.

Figure 12:
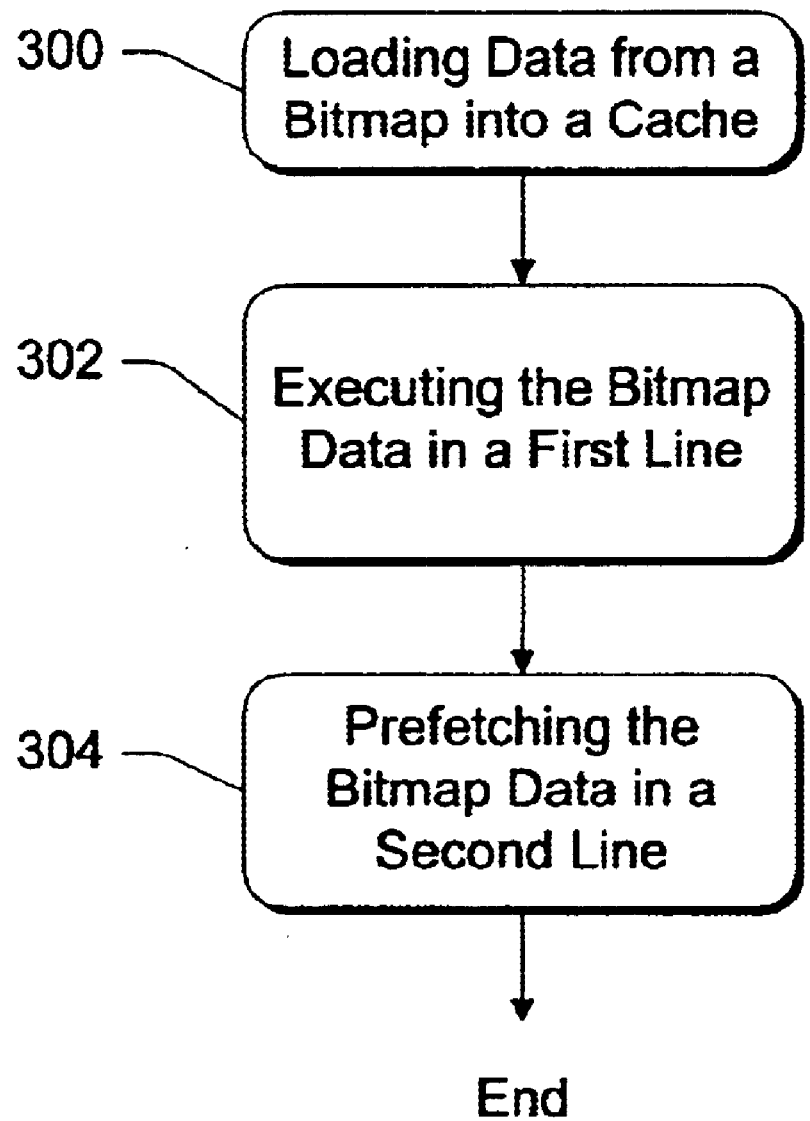
FIG. 12 is a flow diagram showing steps in a method for loading, executing, and pre-fetching data from the hierarchical bitmap into a cache.

FIG. 12 shows a method for managing memory in relation to a cache. Such a method may be used in a system for managing memory blocks in a memory using a hierarchical bitmap. That hierarchical bitmap has entries for directly corresponding memory blocks. Also, the individual bitmap entries may contain a multi-bit value that represents an allocation state of the corresponding memory block.

The memory management method may include the following steps: loading data (at 300 in FIG. 12) from the bitmap into a cache; executing the bitmap data (at 302) in a first line of the cache at a first execution period; and pre-fetching the bitmap data (at 304) in a second line of the cache at a time prior to completion of the first execution period.

Search Strategies

Another advantage of the bitmap approach is that it does not mandate any particular search strategy, as would be the case instead for a free-list based approach (e.g. sequential only). Any one of the well-known searching strategies can be employed (binary search, quicksort, etc.). One possible strategy is to always start at the beginning of the heap. Additional information can be maintained to optimize any particular search strategy, for example the use of one or more first-free hints for sequential search. Another possible strategy could be to search different portions of the bitmap in parallel, either in a shared memory multiprocessor or with the help of specialized hardware. Finally, an implementation might sacrifice some of the cache-friendliness and actually use the data portion of a free block to store any one of many possible auxiliary data structures.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A core memory management system for multiple core memory blocks, core memory being directly addressable by a central processing unit (CPU) of a computer, the core memory management system comprising:

a hierarchical bitmap having entries for directly corresponding ones of the core memory blocks, individual bitmap entries containing a multi-bit value that represents an allocation state of the corresponding core memory block; and a manager configured to manage the core memory blocks via the hierarchical bitmap and to allocate contiguous memory blocks for an allocation.

2. A core memory management system as recited in claim 1, wherein the manager, in response to a change in allocation state of a particular core memory block, is configured to change the multi-bit value in the hierarchical bitmap that corresponds to the particular core memory block to reflect the change in allocation state of the particular core memory block.

3. A core memory management system as recited in claim 1, wherein the individual bitmap entries contain two-bit values to represent at most four different allocation states of the corresponding core memory block.

4. A core memory management system as recited in claim 1, wherein the hierarchical bitmap comprises multiple partial bitmaps that are distributed throughout the multiple core memory blocks.

5. A core memory management system as recited in claim 1, wherein the hierarchical bitmap comprises multiple partial bitmaps that describe allocation states of corresponding sets of plural core memory blocks.

6. A core memory management system as recited in claim 1, wherein the manager, in response to a request to allocate one or more free core memory blocks in the multiple core memory blocks, is configured to scan the hierarchical bitmap for one or more bitmap entries having a multi-bit value that indicates the corresponding core memory block is free for allocation.

7. A core memory management system as recited in claim 1, wherein the manager is configured to deallocate a particular core memory block by changing the corresponding bitmap entry in the hierarchical bitmap from a multi-bit value indicating that the particular core memory block is allocated to a multi-bit value indicating that the particular core memory block is free.

8. A core memory management system as recited in claim 1, wherein the manager is configured to consider adjoining core memory blocks, which are indicated by multi-bit values in the corresponding bitmap entries as free, as a coalesced grouping of core memory blocks that are free for joint allocation.

9. A core memory management system as recited in claim 1, wherein the manager is configured to enlarge a particular allocation of core memory blocks by examining a bitmap entry in the hierarchical bitmap for a next core memory block following the core memory blocks in the particular allocation, the core memory manager determining that enlargement is possible if the bitmap entry has a multi-bit value indicating that next core memory block is free.

10. A core memory management system as recited in claim 1, wherein the manager is configured to reduce a particular allocation of core memory blocks by changing the bitmap entry for a core memory block in the particular allocation from a multi-bit value indicating that the core memory block is allocated to a multi-bit value indicating that the core memory block is free.

11. A core memory management system for multiple core memory blocks, core memory being directly addressable by a central processing unit (CPU) of a computer, the core memory management system comprising:

a hierarchical bitmap having entries for directly corresponding ones of the core memory blocks, individual bitmap entries containing a multi-bit value that represents an allocation state of the corresponding core memory block; and a manager to manage the core memory blocks via the hierarchical bitmap;

wherein the individual bitmap entries contain two-bit values to represent at least three different allocation states, the three allocation states including a "free" state in which the corresponding core memory block is not allocated, a "continue" state in which the corresponding memory block is allocated and part of, but not last in, a larger allocation of plural blocks, and a "last" state in which the corresponding core memory block is allocated and last in an allocation of one or more core memory blocks.

12. A core memory management system for multiple core memory blocks, core memory being directly addressable by a central processing unit (CPU) of a computer, the core memory management system comprising:

a hierarchical bitmap having entries for directly corresponding ones of the core memory blocks, individual bitmap entries containing a multi-bit value that represents an allocation state of the corresponding core memory block; and a manager to manage the core memory blocks via the hierarchical bitmap;

wherein the individual bitmap entries contain two-bit values to represent four different allocation states, the allocation states including a "free" state in which the corresponding core memory block is not allocated, a "sub-allocated" state in which the corresponding core memory block is itself an allocated set of smaller core memory blocks, a "continue" state in which the corresponding core memory block is allocated and part of, but not last in, a larger allocation of plural blocks, and a "last" state in which the corresponding core memory block is allocated and last in an allocation of one or more core memory blocks.

13. A computer-readable medium storing an operating system comprising a core memory management system for multiple core memory blocks, core memory being directly addressable by a central processing unit (CPU) of a computer, the core memory management system comprising:

a hierarchical bitmap having entries for directly corresponding ones of the core memory blocks, individual bitmap entries containing a multi-bit value that represents an allocation state of the corresponding core memory block; and a manager configured to manage the core memory blocks via the hierarchical bitmap and further configured to allocate contiguous memory blocks for an allocation.

14. A computer-readable medium storing an application program comprising a core memory management system for multiple core memory blocks, core memory being directly addressable by a central processing unit (CPU) of a computer, the core memory management system comprising:
- a hierarchical bitmap having entries for directly corresponding ones of the core memory blocks, individual bitmap entries containing a multi-bit value that represents an allocation state of the corresponding core memory block; and
- a manager configured to manage the core memory blocks via the hierarchical bitmap and further configured to allocate contiguous memory blocks for an allocation.

15. A hierarchical bitmap memory manager for managing multiple core memory blocks, core memory being directly addressable by a central processing unit (CPU) of a computer, the hierarchical bitmap memory manager is configured to maintain a hierarchical bitmap with entries for directly corresponding ones of the core memory blocks, the hierarchical bitmap memory manager being configured to allocate different size core memory blocks by sub-allocating a single core memory block of one size into multiple smaller size blocks, the memory manager tracking the smaller size blocks with the hierarchical bitmap by having one entry designate the sub-allocated core memory block and additional entries for each of the smaller size blocks.

16. A hierarchical bitmap memory manager as recited in claim 15, wherein the individual bitmap entries have two-bit values, in which one of the two-bit values identifies the single core memory block as being sub-allocated.

17. A computer-readable medium storing an operating system comprising a hierarchical bitmap memory manager for managing multiple core memory blocks of a core memory, the core memory being directly addressable by a central processing unit (CPU) of a computer, the hierarchical bitmap memory manager is configured to maintain a hierarchical bitmap with entries for directly corresponding ones of the core memory blocks, the hierarchical bitmap memory manager being configured to allocate different size core memory blocks by sub-allocating a single core memory block of one size into multiple smaller size blocks, the memory manager tracking the smaller size blocks with the hierarchical bitmap by having one entry designate the sub-allocated core memory block and additional entries for each of the smaller size blocks.

18. An operating system embodied on a computer-readable medium, the operating system comprising a hierarchical bitmap memory manager for managing plural core memory blocks of a core memory, the core memory being directly addressable by a central processing unit (CPU) of a computer, the memory manager being configured to allocate contiguous memory blocks for an allocation and to maintain a hierarchical bitmap having entries for directly corresponding ones of the core memory blocks, individual bitmap entries containing a multi-bit value that represents an allocation state of the corresponding core memory block.

19. An operating system as recited in claim 18, wherein the hierarchical bitmap comprises multiple partial bitmaps that are distributed throughout the multiple core memory blocks.

20. An operating system as recited in claim 18, wherein the hierarchical bitmap comprises multiple partial bitmaps that describe allocation states of corresponding sets of plural core memory blocks.

21. An operating system embodied on a computer-readable medium, the operating system comprising a hierarchical bitmap memory manager configured to manage plural core memory blocks of a core memory, the core memory being directly addressable by a central processing unit (CPU) of a computer, the memory manager maintaining a hierarchical bitmap having entries for directly corresponding ones of the core memory blocks, individual bitmap entries containing a multi-bit value that represents an allocation state of the corresponding core memory block;
- wherein the individual bitmap entries contain two-bit values to represent at least three different allocation states, the three allocation states including a "free" state in which the corresponding core memory block is not allocated, a "continue" state in which the corresponding core memory block is allocated and part of, but not last in, a larger allocation of plural blocks, and a "last" state in which the corresponding core memory block is allocated and last in an allocation of one or more core memory blocks.

22. An operating system embodied on a computer-readable medium, the operating system comprising a hierarchical bitmap memory manager being configured to manage plural core memory blocks of a core memory, the core memory being directly addressable by a central processing unit (CPU) of a computer, the memory manager maintaining a hierarchical bitmap having entries for directly corresponding ones of the core memory blocks, individual bitmap entries containing a multi-bit value that represents an allocation state of the corresponding core memory block;
- wherein the individual bitmap entries contain two-bit values to represent four different allocation states, the allocation states including a "free" state in which the corresponding core memory block is not allocated, a "sub-allocated" state in which the corresponding core memory block is itself an allocated set of smaller core memory blocks, a "continue" state in which the corresponding core memory block is allocated and part of, but not last in, a larger allocation of plural blocks, and a "last" state in which the corresponding core memory block is allocated and last in an allocation of one or more core memory blocks.

23. A hierarchical bitmap data structure embodied on a computer-readable medium for use with a memory manager that manages core memory blocks of a core memory, the core memory being directly addressable by a central processing unit (CPU) of a computer, the manager being configured to allocate contiguous memory blocks for an allocation, the hierarchical bitmap data structure comprising a plurality of entries for directly corresponding ones of the core memory blocks, individual bitmap entries containing a multi-bit value that represents an allocation state of the corresponding core memory block.

24. A hierarchical bitmap data structure as recited in claim 23, wherein the individual bitmap entries contain two-bit values to represent at most four different allocation states of the corresponding core memory block.

25. A hierarchical bitmap data structure as recited in claim 23, wherein the bitmap entries are distributed throughout the core memory blocks.

26. A hierarchical bitmap data structure as recited in claim 23, wherein the bitmap entries are stored in selected ones of the core memory blocks.

27. A hierarchical bitmap data structure embodied on a computer-readable medium for use with a memory manager that manages core memory blocks of a core memory, the core memory being directly addressable by a central processing unit (CPU) of a computer, the manager being configured to allocate contiguous memory blocks for an allocation, the hierarchical bitmap data structure comprising multiple partial bitmaps that is describe allocation states of directly corresponding sets of plural core memory blocks.

28. A method for managing core memory blocks of a core memory, the core memory being directly addressable by a central processing unit (CPU) of a computer, comprising the following steps:
  allocating contiguous memory blocks for an allocation;
  associating entries in a bitmap with the directly corresponding core memory blocks, individual bitmap entries containing a multi-bit value; and
  tracking allocation states of the core memory blocks by changing the multi-bit value in the bitmap entries.

29. A method as recited in claim 28, further comprising the following steps:
  changing the allocation state of a particular core memory block; and
  changing a multi-bit value in a particular bitmap entry that corresponds to the particular core memory block to reflect the change in allocation state of the particular core memory block.

30. A method as recited in claim 28, wherein adjoining free core memory blocks are automatically coalesced.

31. A method as recited in claim 28, wherein the individual bitmap entries contain two-bit values, and the tracking step comprises the step of tracking at most four different allocation states of the corresponding core memory block.

32. A method as recited in claim 28, further comprising the step of distributing the bitmap entries throughout the core memory blocks.

33. A method as recited in claim 28, further comprising the step of storing the bitmap entries in ones of the core memory blocks.

34. A computer-readable medium having one or more computer executable instructions for performing the steps in the method as recited in claim 28.

35. In a system for managing core memory blocks of a core memory, the core memory being directly addressable by a central processing unit (CPU) of a computer, using a hierarchical bitmap, the hierarchical bitmap having entries for directly corresponding core memory blocks, individual bitmap entries containing a multi-bit value that represents an allocation state of the corresponding core memory block, a method for allocating free core memory blocks comprising the following steps:
  scanning the hierarchical bitmap to locate contiguous bitmap entries where each have a multi-bit value that indicates their corresponding contiguous core memory block is free for allocation;
  allocating the contiguous core memory blocks corresponding to the located contiguous bitmap entries; and
  changing the multi-bit values of the located bitmap entries to indicate that the corresponding core memory blocks are no longer free.

36. A computer-readable medium having one or more computer executable instructions for performing the steps in the method as recited in claim 35.

37. In a system for managing core memory blocks in a memory using a hierarchical bitmap, the hierarchical bitmap having entries for directly corresponding core memory blocks, individual bitmap entries containing a multi-bit value that represents an allocation state of the corresponding core memory block, a method for deallocating a core memory block comprising the following steps:
  receiving a pointer to the core memory block;
  scanning the bitmap to locate a bitmap entry that corresponds to the core memory block, or multiple bitmap entries that correspond to contiguous core memory blocks if the allocation was of a plurality of memory blocks, the bitmap entry having a multi-bit value that indicates that the core memory block is allocated; and
  changing the multi-bit value in the bitmap entry to indicate that the core memory block is free, wherein adjoining free core memory blocks are automatically coalesced.

38. A computer-readable medium having one or more computer executable instructions for performing the steps in the method as recited in claim 37.

39. In a system for managing core memory blocks of a core memory, the core memory being directly addressable by a central processing unit (CPU) of a computer, using a hierarchical bitmap, the hierarchical bitmap having entries for directly corresponding core memory blocks, individual bitmap entries containing a multi-bit value that represents an allocation state of the corresponding core memory block, a method for reallocating to enlarge a previous allocation of contiguous core memory blocks, comprising the following steps:
  scanning the hierarchical bitmap to locate a bitmap entry corresponding to a next core memory block following the contiguous core memory blocks of the previous allocation;
  determining whether the located bitmap entry has a multi-bit value indicating that the next core memory block is free; and
  enlarging the allocation to include the next contiguous core memory block in the event that the multi-bit value indicates that the next contiguous core memory block is free.

40. A method as recited in claim 39, further comprising the step of changing the multi-bit value to indicate that the next core memory block is no longer free.

41. A computer-readable medium having one or more computer executable instructions for performing the steps in the method as recited in claim 39.

42. In a system for managing core memory blocks of a core memory, the core memory being directly addressable by a central processing unit (CPU) of a computer, using a hierarchical bitmap, the hierarchical bitmap having entries for directly corresponding core memory blocks, individual bitmap entries containing a multi-bit value that represents an allocation state of the corresponding core memory block, a method for reallocating to reduce a previous allocation of contiguous core memory blocks, comprising the following steps:
  scanning the hierarchical bitmap to locate a bitmap entry corresponding to a core memory block that is last of the contiguous core memory blocks in the previous allocation; and
  changing a multi-bit value in the located bitmap entry to indicate that the last core memory block is free.

43. A method as recited in claim 42, further comprising the step of changing a multi-bit value in a bitmap entry corresponding to a next-to-last core memory block in the previous allocation to indicate that the next-to-last core memory block is now last in the allocation.

44. A computer-readable medium having one or more computer executable instructions for performing the steps in the method as recited in claim 42.

45. In a system for managing core memory blocks of a core memory, the core memory being directly addressable by a central processing unit (CPU) of a computer, using a hierarchical bitmap, the hierarchical bitmap having entries for directly corresponding core memory blocks, the memory blocks being contiguous for an allocation requiring a plurality of memory blocks, individual bitmap entries containing a multi-bit value that represents an allocation state of the corresponding core memory block, a method comprising the following steps:

loading data from the bitmap into a cache;

executing the bitmap data in a first line of the cache at a first execution period; and pre-fetching the bitmap data in a second line of the cache at a time prior to completion of the first execution period.

46. A memory management system for multiple memory blocks of a core memory, the core memory being directly addressable by a central processing unit (CPU) of a computer, the memory management system comprising:

a hierarchical bitmap having entries for directly corresponding ones of the memory blocks, individual bitmap entries containing a multi-bit value that represents an allocation state of the corresponding memory block; and a manager configured to manage the core memory blocks via the hierarchical bitmap and to allocate contiguous memory blocks for an allocation;

the manager being further configured to consider adjoining memory blocks, which are indicated by multi-bit values in the corresponding bitmap entries as free, as a coalesced grouping of memory blocks that are free for joint allocation.

47. A memory management system for multiple memory blocks of a core memory, the core memory being directly addressable by a central processing unit (CPU) of a computer, the memory management system comprising:

a hierarchical bitmap having entries for directly corresponding ones of the memory blocks, individual bitmap entries containing a multi-bit value that represents an allocation state of the corresponding memory block; and a manager configured to manage the memory blocks via the hierarchical bitmap and to allocate contiguous memory blocks for an allocation;

the manager being further configured to enlarge a particular allocation of memory blocks by examining a bitmap entry in the hierarchical bitmap for a next memory block following the memory blocks in the particular allocation, the memory manager determining that enlargement is possible if the bitmap entry has a multi-bit value indicating that next memory block is free.

48. A memory management system for multiple memory blocks of a core memory, the core memory being directly addressable by a central processing unit (CPU) of a computer, the memory management system comprising:

a hierarchical bitmap having entries for directly corresponding ones of the memory blocks, individual bitmap entries containing a multi-bit value that represents an allocation state of the corresponding memory block; and a manager configured to manage the memory blocks via the hierarchical bitmap and to allocate contiguous memory blocks for an allocation;

the manager being further configured to reduce a particular allocation of memory blocks by changing the bitmap entry for a memory block in the particular allocation from a multi-bit value indicating that the memory block is allocated to a multi-bit value indicating that the memory block is free.

49. A computer-readable medium storing an operating system comprising a memory management system for multiple memory blocks of a core memory, the core memory being directly addressable by a central processing unit (CPU) of a computer, the memory management system comprising:

a hierarchical bitmap having entries for directly corresponding ones of the memory blocks, individual bitmap entries containing a multi-bit value that represents an allocation state of the corresponding memory block; and a manager configured to manage the core memory blocks via the hierarchical bitmap and to allocate contiguous memory blocks for an allocation;

the manager being further configured to consider adjoining memory blocks, which are indicated by multi-bit values in the corresponding bitmap entries as free, as a coalesced grouping of memory blocks that are free for joint allocation.

50. A computer-readable medium storing an operating system comprising a memory management system for multiple memory blocks of a core memory, the core memory being directly addressable by a central processing unit (CPU) of a computer, the memory management system comprising:

a hierarchical bitmap having entries for directly corresponding ones of the memory blocks, individual bitmap entries containing a multi-bit value that represents an allocation state of the corresponding memory block; and a manager configured to manage the core memory blocks via the hierarchical bitmap and to allocate contiguous memory blocks for an allocation;

the manager being further configured to enlarge a particular allocation of memory blocks by examining a bitmap entry in the hierarchical bitmap for a next memory block following the memory blocks in the particular allocation, the memory manager determining that enlargement is possible if the bitmap entry has a multi-bit value indicating that next memory block is free.

51. A computer-readable medium storing an operating system comprising a memory management system for multiple memory blocks of a core memory, the core memory being directly addressable by a central processing unit (CPU) of a computer, the memory management system comprising:

a hierarchical bitmap having entries for directly corresponding ones of the memory blocks, individual bitmap entries containing a multi-bit value that represents an allocation state of the corresponding memory block; and a manager configured to manage the memory blocks via the hierarchical bitmap and to allocate contiguous memory blocks for an allocation;

the manager being further configured to reduce a particular allocation of memory blocks by changing the bitmap entry for a memory block in the particular allocation from a multi-bit value indicating that the memory block is allocated to a multi-bit value indicating that the memory block is free.

52. A computer-readable medium storing an application program comprising a memory management system for multiple memory blocks of a core memory, the core memory being directly addressable by a central processing unit (CPU) of a computer, the memory management system comprising:

a hierarchical bitmap having entries for directly corresponding ones of the memory blocks, individual bitmap entries containing a multi-bit value that represents an allocation state of the corresponding memory block; and a manager configured to manage the core memory blocks via the hierarchical bitmap and to allocate contiguous memory blocks for an allocation;

the manager being further configured to consider adjoining memory blocks, which are indicated by multi-bit values in the corresponding bitmap entries as free, as a coalesced grouping of memory blocks that are free for joint allocation.

53. A computer-readable medium storing an application program comprising a memory management system for multiple memory blocks of a core memory, the core memory being directly addressable by a central processing unit (CPU) of a computer, the memory management system comprising:

a hierarchical bitmap having entries for directly corresponding ones of the memory blocks, individual bitmap entries containing a multi-bit value that represents an allocation state of the corresponding memory block; and a manager configured to manage the memory blocks via the hierarchical bitmap and to allocate contiguous memory blocks for an allocation;

the manager being further configured to enlarge a particular allocation of memory blocks by examining a bitmap entry in the hierarchical bitmap for a next memory block following the memory blocks in the particular allocation, the memory manager determining that enlargement is possible if the bitmap entry has a multi-bit value indicating that next memory block is free.

54. A computer-readable medium storing an application program comprising a memory management system for multiple memory blocks of a core memory, the core memory being directly addressable by a central processing unit (CPU) of a computer, the memory management system comprising:

a hierarchical bitmap having entries for directly corresponding ones of the memory blocks, individual bitmap entries containing a multi-bit value that represents an allocation state of the corresponding memory block; and a manager configured to manage the memory blocks via the hierarchical bitmap and to allocate contiguous memory blocks for an allocation;

the manager being further configured to reduce a particular allocation of memory blocks by changing the bitmap entry for a memory block in the particular allocation from a multi-bit value indicating that the memory block is allocated to a multi-bit value indicating that the memory block is free.

55. A method for managing memory blocks of a core memory, the core memory being directly addressable by a central processing unit (CPU) of a computer, the method comprising:

allocating contiguous memory blocks for an allocation;

associating entries in a bitmap with directly corresponding memory blocks, individual bitmap entries containing a multi-bit value;

tracking allocation states of the memory blocks by changing the multi-bit value in the bitmap entries; and automatically coalescing adjoining free memory blocks.

56. A computer-readable medium having one or more computer executable instructions for performing the steps in the method as recited in claim 55.

57. In a system for managing memory blocks of a core memory, the core memory being directly addressable by a central processing unit (CPU) of a computer, using a hierarchical bitmap, the hierarchical bitmap having entries for directly corresponding memory blocks, each block having a starting location, individual bitmap entries containing a multi-bit value that represents an allocation state of the corresponding memory block, a method for deallocating a memory block comprising:

receiving a pointer that points to a location within the memory block other than the starting location of the memory block;

scanning the bitmap to locate a bitmap entry that corresponds to the memory block, the bitmap entry having a multi-bit value that indicates that the memory block is allocated; and changing the multi-bit value in the bitmap entry to indicate that the memory block is free.

58. A method as recited in claim 57, wherein adjoining free memory blocks are automatically coalesced.

59. A computer-readable medium having one or more computer executable instructions for performing the steps in the method as recited in claim 57.

60. A memory management system for multiple memory blocks of a core memory, the core memory being directly addressable by a central processing unit (CPU) of a computer, the memory management system comprising:

a hierarchical bitmap having entries for directly corresponding ones of the memory blocks, individual bitmap entries containing a multi-bit value that represents an allocation state of the corresponding memory block; and a manager to manage the memory blocks via the hierarchical bitmap;

wherein the manager, in response to a request to deallocate a memory block, such request having a pointer that points to a location within the memory block other than a starting location of the memory block, is configured to:

scan the bitmap to locate a bitmap entry that corresponds to the memory block, the bitmap entry having a multi-bit value that indicates that the memory block is allocated; and change the multi-bit value in the bitmap entry to indicate that the memory block is free.

61. In a system for managing memory blocks of a core memory, the core memory being directly addressable by a central processing unit (CPU) of a computer, using a hierarchical bitmap, the hierarchical bitmap having entries for directly corresponding memory blocks, individual bitmap entries containing a multi-bit value that represents an allocation state of the corresponding memory block, a method for reallocating to enlarge a previous allocation of contiguous memory blocks, comprising:

scanning the hierarchical bitmap to locate a bitmap entry corresponding to a next memory block following the contiguous memory blocks of the previous allocation;

determining whether the located bitmap entry has a multi-bit value indicating that the next memory block is free; and enlarging the allocation to include the next memory block in the event that the multi-bit value indicates that the next memory block is free.

62. A method as recited in claim 61, further comprising changing the multi-bit value to indicate that the next memory block is no longer free.

63. A computer-readable medium having one or more computer executable instructions for performing the steps in the method as recited in claim 61.

* * * * *

UNITED STATES PATENT AND TRADEMARK OFFICE
CERTIFICATE OF CORRECTION

PATENT NO.     : 6,640,290 B1
DATED          : October 28, 2003
INVENTOR(S)    : Forin et al.

It is certified that error appears in the above-identified patent and that said Letters Patent is hereby corrected as shown below:

<u>Column 17,</u>
Line 2, delete "is" between "that" and "describe".

Signed and Sealed this

Third Day of February, 2004

JON W. DUDAS
*Acting Director of the United States Patent and Trademark Office*